US 6,692,833 B2

(12) United States Patent
Zagdoun

(10) Patent No.: US 6,692,833 B2
(45) Date of Patent: Feb. 17, 2004

(54) ARTICLE FORMED BY DEPOSITING A TUNGSTEN-BASED AND/OR MOLYBDENUM-BASED LAYER ON A RIGID SUBSTRATE

(75) Inventor: Georges Zagdoun, La Garenne Colombes (FR)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 10/093,442

(22) Filed: Mar. 11, 2002

(65) Prior Publication Data

US 2002/0094425 A1 Jul. 18, 2002

Related U.S. Application Data

(62) Division of application No. 09/609,157, filed on Jun. 30, 2000, now Pat. No. 6,383,566.

(30) Foreign Application Priority Data

Jun. 30, 1999  (FR) .............................................. 99 08407

(51) Int. Cl.[7] .............................................. B32B 17/06
(52) U.S. Cl. ...................... 428/433; 428/551; 428/655; 428/660; 428/663; 428/665; 428/666; 428/662; 428/668; 428/673; 428/674; 428/680
(58) Field of Search ................................ 428/432, 472, 428/551, 632, 655, 662, 663, 665, 668, 673, 674, 675, 680, 433, 618, 660, 666

(56) References Cited

U.S. PATENT DOCUMENTS

| | | | | |
|---|---|---|---|---|
| 3,785,851 A | | 1/1974 | Novice | 117/54 |
| 4,114,890 A | * | 9/1978 | Yamamoto et al. | 273/237 |
| 4,188,199 A | | 2/1980 | Van Laethem et al. | 65/60 |
| 4,462,883 A | | 7/1984 | Hart | 204/192 C |
| 5,117,299 A | * | 5/1992 | Kondo et al. | 359/58 |
| 5,377,045 A | * | 12/1994 | Wolfe et al. | 359/360 |
| 5,904,555 A | | 5/1999 | Darbha et al. | 438/613 |
| 6,236,440 B1 | * | 5/2001 | Johnson et al. | 349/122 |

FOREIGN PATENT DOCUMENTS

| | | |
|---|---|---|
| EP | 0 560 534 | 9/1993 |
| EP | 0 693 463 | 1/1996 |
| FR | 2 744 116 | 8/1997 |

* cited by examiner

Primary Examiner—Deborah Jones
Assistant Examiner—Andrew T Piziali
(74) Attorney, Agent, or Firm—Pennie & Edmonds LLP

(57) ABSTRACT

The present invention is directed to a process for depositing at least one layer (3) based on tungsten and/or on molybdenum by chemical vapor deposition on a non-conductive substrate (1), such as glass, ceramic, glass-ceramic, or polymer, which includes providing at least one tungsten- and/or molybdenum-containing precursor in the form of a metal halide and/or of an organometallic compound, and at least one reducing agent, such as hydrogen or silane, to form the at least one metal layer. The present invention also relates to the substrate obtained by the preceding process and its applications, especially for producing a glazing, mirrors, or emissive screens.

9 Claims, 2 Drawing Sheets

ARTICLE FORMED BY DEPOSITING A TUNGSTEN-BASED AND/OR MOLYBDENUM-BASED LAYER ON A RIGID SUBSTRATE

This is a divisional of application Ser. No. 09/609,157, filed Jun. 30, 2000, now U.S. Pat. No. 6,383,566.

FIELD OF THE INVENTION

The present invention relates generally to metal layers deposited on rigid substrates, the process of their deposition, the substrate formed therefrom, and the utility of such substrates. In particular, the present invention is directed to processes for depositing one or more metal layers, at least one of which based on tungsten-containing or molybdenum-containing precursors, onto rigid substrates by a variety of methods.

BACKGROUND OF THE INVENTION

The present invention relates to rigid substrates, especially transparent or semi-transparent ceramic-type substrates, such as glass or glass-ceramic substrates or substrates that are barely transparent or non-transparent, and therefore relates to substrates that are generally insulating from an electrical standpoint and that are capable of withstanding heat treatments without deterioration.

Although the present invention is not limited to such an application, as other applications will be detailed within, the present invention are first described with reference to the production of electronic devices, especially to the production of emissive screens, more particularly to those called "flat" screens of the plasma-screen type.

A plasma screen essentially consists of two glass substrates constituting the front and rear faces of the screen, on which substrates functional layers have been deposited. Those layers, deposited on the opposing faces of the substrates, comprise, especially, electrodes, at least a coating of a dielectric material and phosphors, these elements being indispensable for the operation of the screen.

The present invention thus concerns the manufacture of substrates provided with electrically conducting layers capable of forming electrodes after suitable etching treatments, most particularly those using layers made of highly conducting metals, such as silver and copper.

It is known that copper and silver layers may be deposited by electrolysis, which is an attractive technique since it is possible to obtain relatively thick metal layers (for example a thickness of between 1 and 5 $\mu$m) that can be necessary to achieve the required level of conductivity in plasma screens. However, electrolysis can only be implemented in a reasonable production time if the substrate to be covered is itself sufficiently conducting at the start. In general, at least for the front faces of plasma screens, provision is made to interpose a transparent electrically conducting layer made of a doped metal oxide between the glass substrate and the metal electrode layer. When one or more of these layers is etched, the doped metal oxide layer may optionally be etched in a pattern different from that of the metal electrode. This transparent layer may be made of, for example, fluorine-doped tin oxide, F:$SnO_2$, or of tin-doped indium oxide, $Sn:In_2O_3$. The thicknesses in which the doped metal oxide layer is used are chosen for maintaining its transparency, but proved not to be conductive enough to allow electrolysis under satisfactory conditions.

The impetus for the present invention was therefore to remedy this drawback, especially by developing a novel conducting layer which is especially able to serve for "preparing" the surface of an insulating substrate of the glass, ceramic, or glass-ceramic type, in order to allow another metal conducting layer to be deposited by electrolysis.

SUMMARY OF THE INVENTION

The present invention is directed to a process for depositing at least one metal layer based on tungsten or molybdenum by chemical vapor deposition on a non-conductive substrate, which comprises providing at least one tungsten- or molybdenum-containing precursor in the form of a metal halide or an organometallic compound and at least one reducing agent, such as silane or hydrogen, to form the at least one metal layer.

The metal halide is preferably a metal chloride, such as $WCl_6$ or $MoCl_5$, or a metal fluoride, such as $MoF_5$.

The organometallic compound may especially be a metal carbonyl, such as $W(CO)_6$, or alkyl-tungsten or allyl-tungsten compounds, such as butadiene-tungsten or biobenzene tungsten.

Tungsten and molybdenum have a number of advantages when used in the present invention. They are both good electrical conductors, although less conducting than copper or silver. Therefore, these metals may form an integral part of an electrode, consisting essentially of the layer according to the present invention, and/or an integral part of an optional second conducting layer of the copper or silver type, thus contributing to a possible increase in the electrical conductivity that a copper or silver layer alone may have.

Furthermore, these W-based or Mo-based layers lend themselves well to pyrolytic deposition in the vapor phase (also called chemical vapor deposition or CVD) at atmospheric pressure, especially as metal halides, the decomposition temperature of which is typically compatible with the substrates envisaged in the present invention, especially of the glass type. Deposition by CVD may advantageously result in layers which generally adhere well to the substrate and are typically very durable.

Indeed, these W-based or Mo-based layers have proven to be particularly compatible with the materials with which they may come into contact: they coat out well, especially on a surface made of glass and of a metal oxide of the F:$SnO_2$ or $Sn:In_2O_3$ type. Furthermore, molybdenum and tungsten are metals quite similar to copper or silver, particularly in crystal lattice structure. The W and Mo layers also offer nucleation sites for subsequently deposited copper or silver layers, which are deposited very satisfactorily on their surface, to which they tend to adhere very strongly.

Additionally, tungsten and molybdenum are metals which are resistant to solutions usually employed for depositing copper electrolytically, these solutions generally being very highly acidic (pH around 1). Unexpectedly, the W-based or Mo-based layers may however be etched, if necessary, using known chemical etching techniques, especially using oxidizing solutions containing aqua regia and hydrofluoric acid.

Advantageously, when the envisaged substrate is made of glass, a W-based or Mo-based layer may be deposited directly on the ribbon of glass on a float line, especially in the floating chamber. The $WCl_6$-type precursors thus decompose at around 600 to 630° C., and at lower temperatures in the case of $WF_6$, temperatures at which the ribbon of glass has generally acquired, on the float line, its dimensional stability. The atmosphere of the float bath is favorable for deposition in that it is slightly reducing.

Another advantage of molybdenum and tungsten is that they are not very oxidizable, especially at relatively high temperatures. Thus, if the layers are deposited on the ribbon of glass in the floating chamber, they generally do not exhibit little or no oxidizing while the ribbon of glass passes through the lehr.

According to a first embodiment, the W-based or Mo-based layer according to the present invention may be deposited directly on its carrier substrate, especially directly on the glass.

According to a second variant, the W-based or Mo-based layer may be deposited on a layer deposited beforehand on the substrate. There may be one or more pre-deposited layers on the substrate before the deposition of the W-based or Mo-based layer. As mentioned above, this may be a transparent conducting layer of doped metal oxide type, for example, such as fluorine-doped or antimony-doped tin oxide, aluminum-doped zinc oxide, or tin-doped indium oxide. These layers may also be deposited, in a known manner, by chemical vapor deposition or by pyrolysis in the pulverulent phase (reference may be made, for example, to patents EP 158,399, EP 357,263 and WO 88/00588 for the deposition of $F:SnO_2$ layers by CVD and to patents EP 573,325 and WO 94/25410 for the deposition of $F:SnO_2$ layers by pyrolysis of powder). Two successive layers may thus be deposited pyrolytically on the float line when the substrate is a glass substrate. Of course, it is possible to interpose or to add another type of layer providing another functionality and/or contributing to the electrical conductivity of the metal layers. These other layers may thus act as "barrier" layers (for example, to the alkali metals of the glass), such as layers based on $SiO_2$ or on a silicon oxycarbide or oxynitride, such as those described, for example, in patent EP 518,755, and which layers may be deposited beforehand on the ribbon of float glass by chemical vapor deposition.

As mentioned above, provision may advantageously be made to at least partially cover the W-based or Mo-based layer according to the present invention with a layer made of a metal or a metal alloy differing from tungsten or molybdenum, especially one that is more conducting than these two metals, such as copper or silver. This layer may be satisfactorily deposited by electrolysis, for example, in a subsequent step, up to a thickness of several microns, in part due to the level of electrical conductivity, the presence of nucleation sites, and the good adhesion conferred on the substrate by the W-based or Mo-based layer(s). The electrolytic deposition may be carried out in DC mode or in pulsed-current mode.

In pulsed-current electrolytic deposition of non-W-based or non-Mo-based layers, it is preferable to cover-this, for example, copper or silver layer with its own protective layer, especially one which inhibits oxidative degradation. The subsequent deposition of a layer of, for example, a low-melting-point enamel used for the manufacture of plasma screens, may afford such protection. The preferred protective layer is relatively thin and includes metal, especially at least one metal chosen from Ni, Cr, Ti, Ta, Nb, Pd, and Zr, more especially an NiCr alloy.

A metal layer is preferable since it ensures that there is electrical contact with the subsequent layers. It may be deposited in a known matter, for example, by sputtering, especially magnetron sputtering, using a suitable target of metal, or by electrolysis like the layer that it protects.

The subject of the present invention is also directed to a process for electrolytically depositing a metal layer based on copper and/or silver on a glass, ceramic or glass-ceramic substrate, optionally already covered, especially with a transparent electrically conductive layer of a doped metal oxide, especially of the type of those mentioned above. The electrolysis may be carried out by making the surface of the substrate to be covered sufficiently conducting, for example, by pre-depositing, for example, by chemical vapor deposition, a metal layer containing at least tungsten or molybdenum metals upon reacting a precursor of one or more metals with a reducing agent, for example, such as those mentioned above.

The W-based or Mo-based layer of the present invention thus makes it possible to substantially utilize advantages of the electrolysis process, which is very suitable for depositing layers on the order of microns thick. The electrolytically deposited layers, furthermore, generally contain few, if any, pinhole defects, which are typically encountered in vacuum deposition techniques of the sputtering type. The cost of an electrolytic process is also much lower than that of a vacuum deposition process. Furthermore, by suitable selective masking of a substrate before immersing it in an electrolysis bath, one or more layers in a desired pattern may be obtained directly, without an etching step separate from the deposition being necessary.

After deposition, etching may be performed on at least one of the aforementioned layers, especially to aid in the formation of electrodes, in defined patterns suitable for the desired applications.

The present invention is also directed to a rigid transparent substrate, for example, such as glass, ceramic, or a glass-ceramic composite, which substrate can be provided with layers, including a metal layer based on tungsten and/or molybdenum, especially deposited by chemical vapor deposition, and including a metal layer based on copper and/or silver, especially deposited by electrolysis. These substrates may advantageously be obtained by any of the processes described above.

It is also within the scope of the present invention to deposit the W-based or Mo-based layer by deposition techniques other than pyrolysis or CVD. These may especially be vacuum deposition techniques of the sputtering type, optionally magnetron sputtering. Particularly with magnetron sputtering, the substrate is generally organic, as opposed to previously stated inorganic substrates, and can include one or more polymers made of, for example, rigid transparent material, such as polymethyl methacrylate (PMMA) or polycarbonate.

As mentioned above, the substrate may be provided with one or more other functional layers, especially beneath the W-based or Mo-based metal layer. The one or more other layers may include, for example, a transparent electrically conducting layer of the doped- metal oxide type, as mentioned above. In the production technique for manufacturing emissive screens, especially, in this case, on a "front" face beneath metal electrodes, which are preferably based on copper and/or silver, it may be preferable to provide another series of electrodes, obtained by etching but based on transparent conducting layers. The presence of the other series of electrodes can help reduce the strike voltage between two facing electrodes of the front and rear faces of the emissive screen, as well as to make a plasma discharge between two glass panels thereof homogeneous. The electrically conducting layer may be deposited pyrolytically or by sputtering, especially reactive sputtering in an oxidizing atmosphere, using a target made of an ad hoc metal alloy. The thickness of said layer is preferably from 50 nm to 500 nm, preferably between 100 nm and 400 nm in the case of $F:SnO_2$, and preferably between 50 nm and 120 nm in the case of $Sn:In_2O_3$.

The silver-based or copper-based layer may optionally be further coated with a protective layer based on at least one of the metals belonging to the group comprising chromium, nickel, titanium, tantalum, niobium, palladium, and zirconium, preferably based on a NiCr alloy, a steel, or a chromium alloy. The thickness of the further protective layer is preferably sufficient to fulfill its protective role without unnecessary or significant detrimental effects to cost and/or deposition time, more preferably from 10 nm to 300 mn, most preferably between 30 nm and 200 nm.

Preferably, the thickness of the W-based or Mo-based layer is determined by the level of conductivity required for carrying out the electrolysis, which level may especially be evaluated as a resistivity of $8 \times 10^{-5}$ ohm*cm, corresponding to a surface resistance less than or equal to 10 ohms per square. Preferably, the thickness is from 30 nm to 500 nm, more preferably between 50 nm and 300 nm, most preferably between 70 nm and 130 nm.

With respect to the copper or silver layer, the thickness is preferably between 0.1 $\mu$m and 10 $\mu$m, more preferably between 0.5 $\mu$m and 5 $\mu$m, most preferably between 1.5 $\mu$m and 3 $\mu$m.

The applications of the substrates described above may vary greatly and therefore may involve a number of further processing steps. Thus, if a glass-type substrate is intended to be used as a front face of an emissive screen, it may be advantageously arranged to cover the substrate, once the etching operation(s) has (have) been completed, with a protective coating including at least one layer of a dielectric material, especially one having a low melting point, preferably of the PbO type, or of a mixture of various oxides. Alternately, if a glass-type substrate is intended to be used as the rear face of an emissive screen, the substrate provided with its etched layers can be subsequently covered, at least partially, preferably with one or more coatings, of materials containing, for example phosphors.

The substrate according to the present invention, if intended to be used as the rear face of an emissive screen, can preferably be "compartmentalized" into pixels separated from one another by walls generally made of glass having a low melting point, for example, a PbO-based glass.

The tungsten or molybdenum layer according to the present invention may also be used alone on a substrate to functionalize it. For example, on a glass-type transparent substrate, this sole layer may give impart reflective properties in the thermal radiation range, for example, as a thermal protection glazing, or in the visible range, for example, as a glazing with a moderate level of light transmission, e.g., for buildings or vehicles. Alternately, the present invention may serve as a mirror. Similar applications may also be envisioned if the present invention is further coated with a copper or silver layer and optionally with one or more protective layers.

The tungsten or molybdenum layer may more generally be employed wherever electrodes or current leads are required, again optionally combined with a copper or silver layer. Thus, the present invention may be used as resistance heating elements, for example, for anti-fogging/anti-frosting heated widows, glass-ceramic plates used in cookers, or even for forming heating mirrors. Of course, the thickness of the W-based or Mo-based layer may be adapted to the application, as can other properties of the substrate, the present invention, or any layer thereof, to suit the particular application.

BRIEF DESCRIPTION OF THE DRAWINGS

The present invention will now be described in greater detail by means of non-limiting embodiments illustrated by the following figures.

DETAILED DESCRIPTION OF THE PREFERRED EMBODIMENTS

Within the context of the present invention, the term "layer" should be understood to mean the usually continuous coating that covers the substrate, directly or indirectly, as over other layers or functional materials, and which may be intended subsequently to be further processed before commercial use. Thus, here, a metal layer based on W and/or Mo, and optionally a layer based on Cu and/or Ag may then be subsequently etched in order to serve as electrodes. The same applies to any protective layer and/or a layer of doped metal oxide, if these layers are present. The present invention can therefore apply to a semi-finished "intermediate" product, in which the electrodes are in the form of continuous layers, as well as to a "finished" product in which the electrodes are in a desired pattern, and thus more desirable for commercial use. Of course, it should also be considered an aspect of the present invention when one or more layers is deposited directly in a discontinuous form, for example, using suitable masks during the deposition operations.

Figure 1:
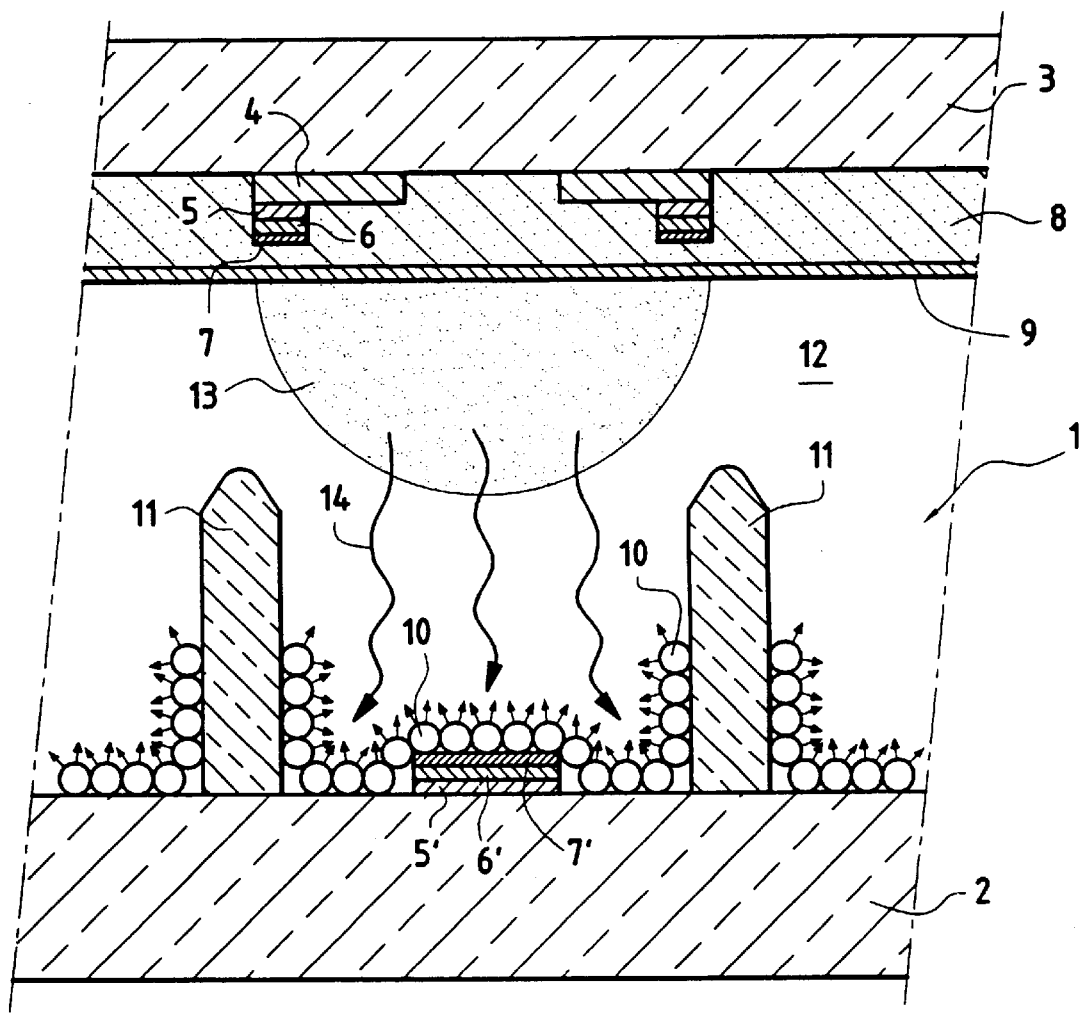
FIG. 1: a diagram illustrating the operating principle of a plasma screen.

One particularly advantageous use of the present invention relates to emissive flat plasma screens utilizing glass substrates. FIG. 1 schematically demonstrates the way in which a plasma screen functions, by showing a partial side view of a pixel of such a screen 1, which, in a preferred embodiment, includes two glass substrates 2 and 3 oriented to face each other. In a preferred embodiment, the substrate 3 is intended to be the front face of the screen and has an etched layer 4, made of $F:SnO_2$ (forming a transparent electrode), covered with a tungsten layer 5 onto which a copper layer 6 and then a nickel layer 7 are coated. In this embodiment, the conducting layers 5, 6, and 7 form the "main" electrodes. Also in this embodiment, the $F:SnO_2$ layer 4 is etched in a first pattern, and the W/Cu/Ni layers are identically etched in a second pattern. The stack of layers 4 to 7 can be covered with a protective coating including a layer 8 made of a low-melting-point oxide, for example PbO, which is itself coated with a protective layer 9 made of MgO.

Another substrate 2 can be the rear face of the screen and have a tungsten layer 5' coated with a copper layer 6', which is further covered with a nickel layer 7'. The layers 5', 6', and 7' may advantageously act as "address" electrodes, in relation to those of the front face. All three layers may optionally be etched in the same pattern and covered with a phosphor coating 10. The phosphors normally used in the case of a color plasma screen are $Zn_2SiO_4$ for obtaining the green color, $Eu:BaMgAL_{14}O_{0.22}$ for obtaining the blue color and $Eu:Y_2O_3$ for obtaining the red color.

Each pixel of the screen can be separated from the others by walls 11 formed from a glass frit, for example, made of a PbO-based glass.

The space 12 created between the two substrates 2, 3 can be filled with a gas, for example, a mixture of neon and xenon. In use, this gas mixture may be excited by applying a voltage between the electrodes 5, 6, 7 and 5', 6', 7' to obtain a plasma discharge 13 containing $Xe^+$ and $Ne^+$ ions. These ions generally emit UV photons 14 having a wavelength of approximately 145 nm, which can excite the phosphors 10, which convert the excitation energy into red, green, or blue visible light.

The present invention also relates to the manufacture of electrodes 4, 5, 6, and 7 for front faces 3, and electrodes 5', 6', and 7' for rear faces 4, which can be carried out in the following manner: thick (e.g., 3 mm) glass substrates 2, 3 are chosen, for example, from the disclosure of International Publication No. WO 96/11887, which compositions can be suitable for emissive screens (substrates having thickness ranges generally between 1.5 and 3 mm may be chosen).

In a preferred embodiment, the front face of an emissive plasma screen is made the following way. First, an $F:SnO_2$ layer 4 can be continuously deposited by CVD onto a ribbon of float glass in a floating chamber, using, in a known manner, MBTCl (monobutyltin trichloride) as a metal precursor and fluoroacetic acid as a fluorinated precursor reducing agent. The layer formed preferably has a thickness of 300 nm.

Figure 2:
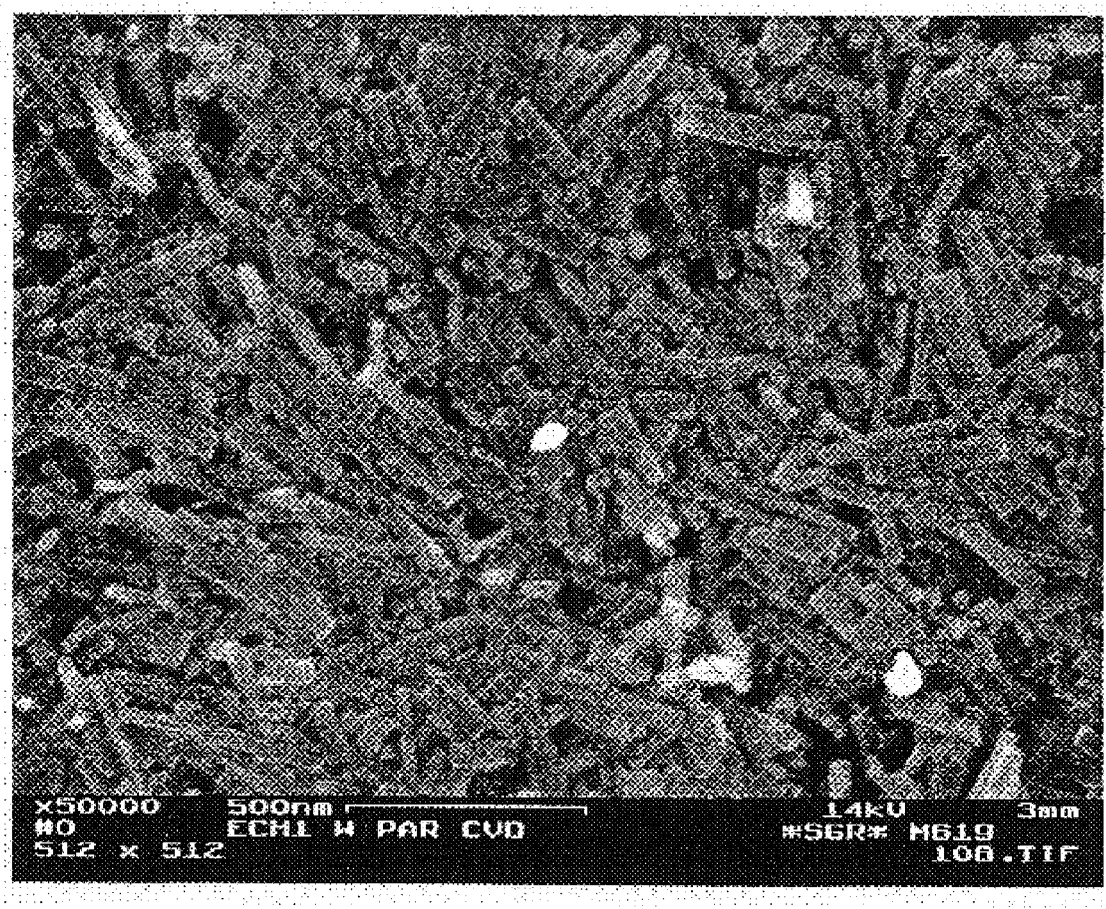
FIG. 2: a photograph, taken in a scanning electron microscope, of a tungsten layer according to the present invention.

Still in the floating chamber, a tungsten layer can be deposited by CVD from a $WCl_6$ precursor and a hydrogen reducing agent, in suitable proportions. Preferably, a thickness of 50 nm to 200 nm, more preferably 150 nm, may be chosen. The deposition can be carried out at with the glass substrate temperature preferably of between 610° C. and 630° C. The device used is conventional, similar to that used for depositing the above $F:SnO_2$ layer. The $WCl_6$ precursor, in solid form, may be introduced, prior to the deposition, into a sealed chamber heated to approximately 200° C. at a mercury vapor pressure of 7 mm. Next, the chamber can be flushed with a stream of a reducing gas, preferably an $N_2/H_2$ gas mixture in a volume proportion of approximately 90/10, this stream becoming laden with sublimed $WCl_6$ vapor, at a temperature maintained, however, below 350° C. to prevent the $WCl_6$ from being reduced to metallic W prematurely. Compared with the $WCl_6$, hydrogen is in excess in the gas stream, which is fed into a delivery nozzle. FIG. 2 shows a cross section of the tungsten layer, analyzed by field-effect scanning electron microscopy, which layer appears to show entangled rods (approximately $40 \times 500$ $nm^2$) over the thickness of the layer. It has been shown by x-ray diffraction that the layer consists very largely of metallic tungsten with, in some cases, small traces of identifiable oxides ($WO_2$ and $H_{0.23}WO_3$).

The ribbon of glass, once at the end of the line, is cut up and treated in an appropriate manner.

The substrates coated with the $F:SnO_2$ and tungsten-based layers can then undergo electrolysis for the purpose of depositing a copper layer on top of the tungsten layer with a thickness of between, for example, 1 $\mu$m and 2 $\mu$m. The electrolysis can be carried out in a known manner in an electrolysis bath containing a copper plating solution at pH 1. The copper plating solution is made, for example, in the following manner: 210 grams of $CuSO_4 \cdot 5H_2O$, 27 grams of $H_2SO_3$ of relative density 1.88, and optionally various known additives, all per one liter of deionized water.

In the absence of a tungsten layer, the 300 nm thick $F:SnO_3$ layer has a surface resistance typically of 20 ohms per square, which is typically insufficient to allow the copper solution to be electrolyzed satisfactorily. In addition, the copper is usually deposited inhomogeneously and has neither the required thickness nor the required quality. On the other hand, interposing the tungsten layer can aid in achieving a surface resistance of the substrate of at most 10 $ohms/cm^2$.

Depending on the tungsten thickness and the deposition conditions, the tungsten layers may have a surface resistance from 2 ohms per square to 8 ohms per square, with a corresponding resistivity between $10^{-5}$ ohm*cm and $5 \times 10^{-3}$ ohm*cm, which generally allow copper to be deposited electrolytically under much better conditions, i.e., where the copper layer is strongly adherent to the tungsten layer, completely continuous, and has grains of a size generally between 300 nm and 1 $\mu$m. The deposition conditions, e.g., the nature of the bath, current density, presence of additives, temperature, etc., allow tailoring to some extent of the morphology of the copper layer, as is known in the electrolysis art. The electrolysis can be carried out conventionally, e.g., the cathode consisting of a glass substrate already coated with suitable layer(s) and the anode, being consumable and made of a copper plate that has substantially the same surface area as the cathode. The two electrodes may be immersed in an electrolysis solution, oriented to face each other and separated by a distance of approximately 3 cm. The electrical supply can be a stabilized DC or pulsed current. The current density can be chosen to be approximately 33 $mA/cm^2$ (but this may be chosen to be different, especially greater, for example, up to 1 $A/cm^2$). The deposition time can be adapted according to the desired layer thickness and the selected current density. In this embodiment, to obtain an approximately 1.8 $\mu$m thick copper layer, approximately 100 seconds were required.

The measured resistivity of the copper layer made by the above process may advantageously be between $2 \times 10^{-6}$ ohm*cm and $4 \times 10^{-6}$ ohm*cm, i.e. close to that of bulk copper, which is $1.7 \times 10^{-6}$ ohm*cm, proof of the quality and density of the layer.

It has been found that a tungsten-copper bilayer may have a black metallic appearance when observed from the same side as the bare face of the glass substrate 3. This blackening has advantageously proven to be an asset by allowing contrast of an image obtained by the plasma screen to be increased, while preventing, or at the very least limiting, light reflection of ambient light on the surface of the copper layer.

Optionally, a nickel layer can be deposited on the copper layer by magnetron sputtering using a nickel target, in a known manner, the layer thickness preferably being 100 mn.

In a preferred embodiment, the $F:SnO_2$ layer is etched in a first pattern and the tungsten, copper, and nickel layers are etched in a second pattern, by any etching method known to one of ordinary skill in the art, e.g., in a base or acid medium, or by plasma etching, optionally but preferably using a mask based on a heat-meltable ink deposited by a printing technique, for example, such as an ink jet, for example, as described in the European Patent Application No. 99400427.3.

Also optionally but preferably, a layer 8 including a low-melting-point oxide can then be deposited.

In a preferred embodiment, the rear face of an emissive plasma screen is made the following way. A tungsten layer is deposited directly on a ribbon of float glass, for example, in the same way as described above for the front face, which layer preferably has a thickness of 120 nm, a similar morphology, and similar electrical properties as that of the front face. It is preferred that a copper layer is then deposited electrolytically, preferably with a thickness of 2 $\mu$m, followed by deposition of a nickel layer, preferably by sputtering, to a thickness preferably of 110 nm, similar to that of the front face. The copper layer should also preferably have similar quality and electrical performance characteristics as the front face.

Optionally but preferably, the three layers can be etched in the same pattern by a known process. Also optionally but preferably, again by a known process, a phosphor coating may be deposited and then surrounded by walls made of glass frit, to help segment the rear face into pixels.

In forming both front faces and rear faces of a plasma screen, as detailed above, it is considered to be within the scope of the present invention to substitute the $F:SnO_2$ layers with $Sn:In_2O_3$ or $Sb:SnO_2$ layers and the nickel layers with, in particular, layers of chromium or nickel-chromium alloy.

Using one or more suitable masks, the upper layer may be etched while it is being electrolytically deposited, thus producing the electrode array directly. The protective layers based on nickel (or other metals) may also be electrolytically deposited, in a similar manner to the electrolytic deposition described for the copper layers. Optionally, the copper layer may be replaced with another highly conducting metal layer, based on, for example, Ag, Au, and the like.

Advantageously, a chemical etching solution based on a mixture of hydrogen peroxide and aqueous ammonia may be used to etch the tungsten layer, and/or a solution comprising ferric sulfate may be used to etch the copper layer. The etching solutions should, however, be specific to the metal layer to be etched. Optionally, the tungsten-based and/or molybdenum-based layer may be etched in a different pattern than the copper-based and/or silver-based layer.

For example, the tungsten-based and/or molybdenum-based layer may be deposited, with the copper-based and/or silver-based layer being deposited next, and then both layers may be etched. Alternately, the tungsten-based and/or molybdenum-based layer may first be etched, before the copper-based or silver-based layer is deposited, which can then be etched directly on the pattern of the subjacent layer or in a different pattern altogether. In such an embodiment, an extra etching step is avoided, such that the copper and/or silver can be deposited electrolytically only at the places where it is required, namely where there is the pattern of the etched W layer, hence saving on the amount of copper used.

In conclusion, the tungsten-based and/or molybdenum-based layers according to the present invention lend themselves well to continuous deposition on a float line. When deposited according to the processes of the present invention, the tungsten-based and/or molybdenum-based layers are generally of good quality and aid in the deposition of upper metal layers by electrolysis. The tungsten-based and/or molybdenum-based layers advantageously allow deposition of relatively thick electrodes on insulating substrates, or at the very least on substrates which are not sufficiently conducting from an electrical standpoint.

Independently of any subsequent electrolytic deposition, the tungsten-based and/or molybdenum-based layer(s) can yield light reflection levels up to 60 to 65% on glass substrates, indicating the feasibility of continuous manufacture of reflective glazing or mirrors directly on a float line.

It may also be advantageous to deposit these tungsten or molybdenum layers by atmospheric-pressure CVD on the float glass but in a subsequent operation, especially by sputtering or by reduced-pressure CVD, thereby allowing the use of substrates that are less thermally resistant than glass, ceramic, or glass-ceramic composites, for example, such as transparent substrates based on an organic polymer.

What is claimed is:

1. An article comprising (i) a non-conductive substrate with at least one metal layer based on tungsten or molybdenum deposited thereon, (ii) a copper or silver layer at least partially covering the tungsten or molybdenum layer and in direct contact the tungsten and molybdenum layer, and (iii) at least one protective layer that at least partially covers the copper or silver layer, wherein the protective layer has a thickness ranging from 10 nm to 300 nm and comprises at least one metal chosen from the group consisting of nickel, chromium, titanium, tantalum, niobium, palladium, and zirconium; wherein the metal layer is deposited by a process which comprises:

providing at least one tungsten- or molybdenum-containing precursor in the form of a metal halide or an organometallic compound and at least one reducing agent; and forming the at least one metal layer from the tungsten- or molybdenum-containing precursor and the at least one reducing agent by chemical vapor deposition.

2. An article comprising (i) a non-conductive substrate with at least one metal layer based on tungsten or molybdenum deposited thereon, (ii) a copper or silver layer at least partially covering the tungsten or molybdenum layer and in direct contact the tungsten and molybdenum layer, and (iii) at least one protective layer that at least partially covers the copper or silver layer, wherein the protective layer has a thickness ranging from 10 nm to 300 nm and comprises at least one metal chosen from the group consisting of nickel, chromium, titanium, tantalum, niobium, palladium, and zirconium.

3. The article of claim 1, wherein the substrate is a glass, ceramic, glass-ceramic composite, or polymer.

4. The article of claim 1, wherein the thickness of the copper or silver layer is between 0.1 $\mu$m and 10 $\mu$m.

5. The article of claim 1, wherein the at least one of the layers is etched or deposited in a discontinuous manner.

6. The article of claim 1, wherein the thickness of the tungsten or molybdenum layer is between 30 nm and 500 nm.

7. The article of claim 2, wherein the substrate is a glass, ceramic, glass-ceramic composite, or polymer.

8. The article of claim 2, wherein the thickness of the copper or silver layer is between 0.1 $\mu$m and 10 $\mu$m.

9. The article of claim 2, wherein the thickness of the tungsten or molybdenum layer is between 30 nm and 500 nm.

* * * * *